(12) United States Patent
Hahn et al.

(10) Patent No.: US 11,877,216 B2
(45) Date of Patent: Jan. 16, 2024

(54) METHOD AND APPARATUS FOR SELECTING CARRIER IN COMMUNICATION SYSTEM SUPPORTING VEHICLE TO EVERYTHING COMMUNICATION

(71) Applicants: Hyundai Motor Company, Seoul (KR); Kia Corporation, Seoul (KR)

(72) Inventors: Gene Back Hahn, Gyeonggi-do (KR); Seung Wook Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 337 days.

(21) Appl. No.: 17/399,677

(22) Filed: Aug. 11, 2021

(65) Prior Publication Data

US 2021/0377709 A1 Dec. 2, 2021

Related U.S. Application Data

(62) Division of application No. 16/245,430, filed on Jan. 11, 2019, now Pat. No. 11,122,399.

(Continued)

(30) Foreign Application Priority Data

Dec. 21, 2018 (KR) ........................ 10-2018-0167482

(51) Int. Cl.
| | |
|---|---|
| *H04W 4/40* | (2018.01) |
| *H04W 24/10* | (2009.01) |
| *H04W 72/02* | (2009.01) |
| *H04W 76/27* | (2018.01) |
| *H04W 80/02* | (2009.01) |

(Continued)

(52) U.S. Cl.
CPC ............. *H04W 4/40* (2018.02); *H04W 24/10* (2013.01); *H04W 72/02* (2013.01); *H04W 72/0453* (2013.01); *H04W 72/23* (2023.01); *H04W 72/542* (2023.01); *H04W 76/27* (2018.02); *H04W 80/02* (2013.01); *H04W 72/52* (2023.01)

(58) Field of Classification Search
CPC ....... H04W 4/40; H04W 24/10; H04W 72/02; H04W 72/0453; H04W 72/23; H04W 72/52; H04W 72/542; H04W 76/14; H04W 76/27; H04W 80/02
See application file for complete search history.

(56) References Cited

U.S. PATENT DOCUMENTS

| | | | |
|---|---|---|---|
| 2015/0236782 A1* | 8/2015 | Kadous | ................. H04W 74/04 370/337 |
| 2017/0013630 A1* | 1/2017 | Franz | ................. H04W 72/542 |

(Continued)

*Primary Examiner* — Khoa Huynh
(74) *Attorney, Agent, or Firm* — Fox Rothschild LLP

(57) ABSTRACT

An operation method of a terminal located in a vehicle supporting vehicle-to-everything (V2X) communication may include: receiving, from a base station, a first message requesting reporting of a first counter corresponding to a channel busy ratio (CBR) measurement cycle for a carrier (re)selection procedure; transmitting, by the terminal, a second message including the first counter to the base station; and receiving, from the base station, a third message including a second counter corresponding to a CBR measurement cycle for a resource pool (re)selection procedure. The second counter can be reconfigured by the base station to be greater than or equal to the first counter.

8 Claims, 8 Drawing Sheets

Related U.S. Application Data

(60) Provisional application No. 62/649,261, filed on Mar. 28, 2018, provisional application No. 62/616,677, filed on Jan. 12, 2018.

(51) Int. Cl.
*H04W 72/0453* (2023.01)
*H04W 72/23* (2023.01)
*H04W 72/542* (2023.01)
*H04W 72/52* (2023.01)

(56) References Cited

U.S. PATENT DOCUMENTS

| | | |
|---|---|---|
| 2017/0171768 A1 | 6/2017 | Kim et al. |
| 2018/0049269 A1 | 2/2018 | Fujishiro et al. |
| 2018/0288637 A1* | 10/2018 | Laselva ................. H04W 76/28 |
| 2019/0274065 A1 | 9/2019 | Zhao et al. |

* cited by examiner

METHOD AND APPARATUS FOR SELECTING CARRIER IN COMMUNICATION SYSTEM SUPPORTING VEHICLE TO EVERYTHING COMMUNICATION

CROSS-REFERENCES TO RELATED APPLICATIONS

This application is a Division Application of U.S. Ser. No. 16/245,430, filed on Jan. 11, 2019, which claims the benefit of priority to U.S. Provisional Patent Application No. 62/616,677, filed on Jan. 12, 2018, and U.S. Provisional Patent Application No. 62/649,261, filed on Mar. 28, 2018, each of which filed in the U.S. Patent and Trademark Office, and Korean Patent Application No. 10-2018-0167482, filed on Dec. 21, 2018 in the Korean Intellectual Property Office (KIPO), the entire contents of which are incorporated herein by reference.

BACKGROUND

1. Technical Field

The present disclosure relates generally to vehicle-to-everything (V2X) communication, and more specifically, to a method and an apparatus for selecting a carrier in a V2X communication system carrier aggregation (CA).

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system), as well as the frequency band of the 4G communication system, has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

In the cellular communication system supporting the V2X communications (e.g., C-V2X communication), a communication node located in a vehicle may perform communication based on a carrier aggregation (CA) scheme. In this case, the communication node located in the vehicle may communicate with a base station using one or more secondary carriers as well as a primary carrier.

For example, the communication node may select a secondary carrier, receive configuration information of a resource pool for the secondary carrier from the base station, and use the resource pool configured by the base station to perform communications. Here, the communication node can perform a selection, or re-selection, (i.e., "(re)selection") procedure of the secondary carrier based on a channel busy ratio (CBR). The CBR may be transmitted from the communication node to the base station.

Meanwhile, CBR measurement for the carrier (re)selection procedure may be performed according to a preset cycle (hereinafter referred to as a "carrier CBR cycle"), and CBR measurement for a resource pool (re)selection procedure may also be performed according to a preset cycle (hereinafter referred to as a "resource pool CBR cycle"). In the event that the carrier CBR cycle is longer than the resource pool CBR cycle, the resource pool (re)selection procedure according to the resource pool CBR cycle may be performed while the V2X communication is performed using the secondary carrier selected by the communication node. However, the V2X communication may be delayed when the resource pool for the secondary carrier is reconfigured by the resource pool (re)selection procedure.

SUMMARY

Accordingly, embodiments of the present disclosure provide a method of (re)selecting a carrier for preventing a communication delay in a communication system supporting V2X communications.

According to embodiments of the present disclosure, an operation method of a terminal located in a vehicle supporting vehicle-to-everything (V2X) communication may include: receiving, from a base station, a first message requesting reporting of a first counter corresponding to a channel busy ratio (CBR) measurement cycle for a carrier (re)selection procedure; transmitting, by the terminal, a second message including the first counter to the base station; and receiving, from the base station, a third message including a second counter corresponding to a CBR measurement cycle for a resource pool (re)selection procedure. The second counter can be reconfigured by the base station to be greater than or equal to the first counter.

The terminal may perform V2X communication based on a carrier aggregation (CA) scheme, and one or more secondary carriers may be (re)selected in the carrier (re)selection procedure.

The first message may be a radio resource control (RRC) message including configuration information of a resource pool.

The first message may include configuration information for the carrier (re)selection procedure.

The second message may include user equipment (UE) assistance information.

The second counter may be received through an RRC message or downlink control information (DCI).

Furthermore, in accordance with embodiments of the present disclosure, an operation method of a terminal located in a vehicle supporting vehicle-to-everything (V2X) communication may include: receiving, from a base station, a first message requesting reconfiguration of a first counter corresponding to a channel busy ratio (CBR) measurement cycle for a resource pool (re)selection procedure; comparing, by the terminal, the first counter and a second counter corresponding to a CBR measurement cycle for a carrier (re)selection procedure; and reconfiguring, by the terminal, the first counter such that the first counter is greater than or equal to the second counter when the first counter is shorter than the second counter.

The operation method may further include transmitting, by the terminal, a second message including the reconfigured first counter to the base station.

The second message may include user equipment (UE) assistance information.

The terminal may perform V2X communication based on a carrier aggregation (CA) scheme, and one or more secondary carriers may be (re)selected in the carrier (re)selection procedure.

The first message may be a radio resource control (RRC) message including configuration information of a resource pool.

The first counter and the second counter may be operated independently of each other.

Furthermore, in accordance with embodiments of the present disclosure, an operation method of a terminal located in a vehicle supporting vehicle-to-everything (V2X) communication may include: receiving, from a base station, a first message requesting reporting of information indicating a presence of an interval #n+1 according to a channel busy ratio (CBR) measurement cycle for a carrier (re)selection procedure; transmitting, by the terminal, a second message to the base station when the interval #n+1 exists after a current interval #n, the second message including information indicating that the interval #n+1 is present; and receiving, from the base station, a third message including information indicating that a CBR measurement for a resource pool (re)selection procedure is deactivated until an end of the interval #n+1, wherein the carrier (re)selection procedure is performed in each of the interval #n and the interval #n+1, and n is an integer greater than or equal to 0.

The information indicating that the interval #n+1 is present may indicate that a counter for the interval #n+1 is configured.

The transmitting of the second message may be performed when each interval according to the CBR measurement cycle for the carrier (re)selection procedure ends.

The first message may be a radio resource control (RRC) message including configuration information of a resource pool.

Furthermore, in accordance with embodiments of the present disclosure, an operation method of a terminal located in a vehicle supporting vehicle-to-everything (V2X) communication may include: receiving, from a base station, a first message including information indicating a deactivation of a channel busy ratio (CBR) measurement for a resource pool (re)selection procedure; performing, by the terminal, a carrier (re)selection procedure without the CBR measurement for the resource pool (re)selection procedure in an interval #n according to a CBR measurement cycle for the carrier (re)selection procedure; and when the carrier (re)selection procedure is completed in the interval #n, transmitting, by the terminal, a second message to the base station, the second message including information indicating whether the carrier (re)selection procedure performed in the interval #n is a last carrier (re)selection procedure.

The CBR measurement for the resource pool (re)selection procedure may not be performed by the terminal until the last carrier (re)selection procedure is completed.

The operation method may further include, after transmitting the second message, and when the second message includes information indicating that the carrier (re)selection procedure performed in the interval #n is the last carrier (re)selection procedure, receiving, from the base station, information indicating an activation of the CBR measurement for the resource pool (re)selection procedure.

The first message may be a radio resource control (RRC) message including configuration information of a resource pool.

According to the embodiments of the present disclosure, when the carrier CBR cycle is longer than the resource pool CBR cycle, the resource pool CBR cycle can be reconfigured to be greater than or equal to the carrier CBR cycle. Also, even when the CBR measurement result for resource pool (re)selection satisfies a resource pool (re)selection condition while V2X communication is performed using the carrier selected by the communication node, the CBR measurement result can be ignored. Therefore, since the resource pool is not (re)selected while the V2X communication is performed using the carrier selected by the communication node, delay of the V2X communication can be prevented, thereby improving the performance of the communication system.

BRIEF DESCRIPTION OF DRAWINGS

Embodiments of the present disclosure will become more apparent by describing in detail embodiments of the present disclosure with reference to the accompanying drawings, in which.

Figure 1:
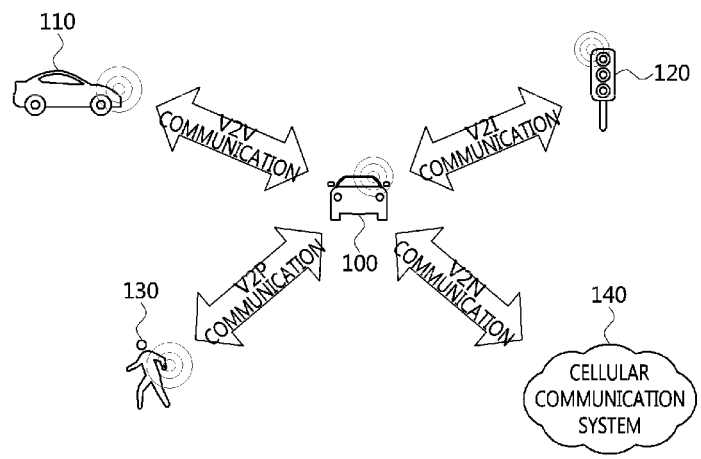
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Also, the symbol '#' is used herein to denote a number, such as an interval number.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., a terminal, a communication node, etc.) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
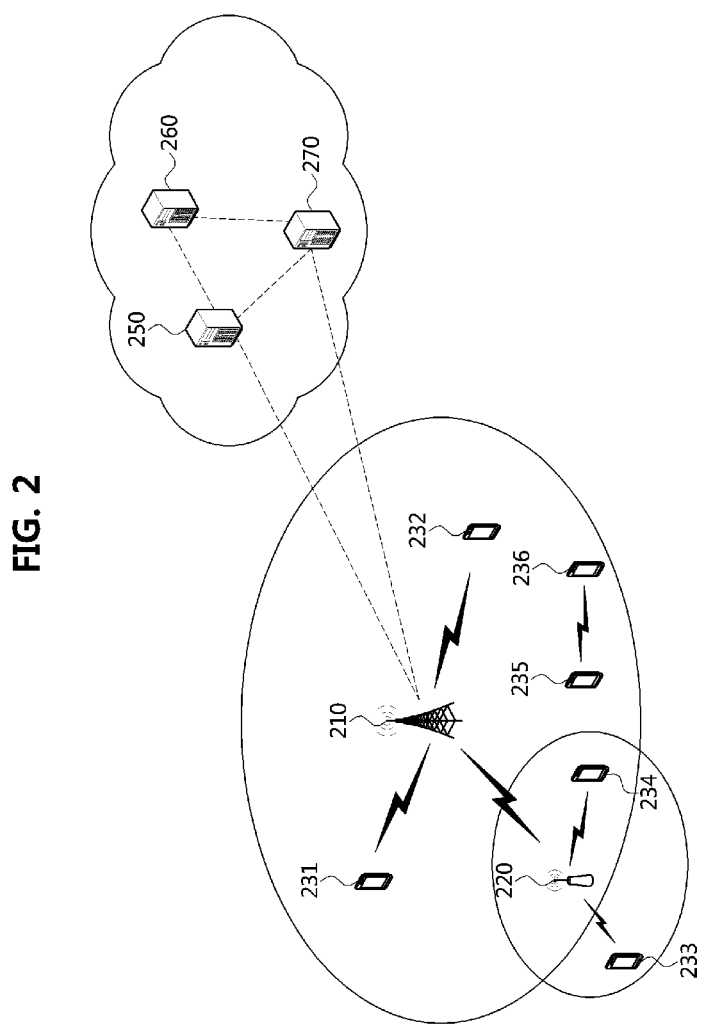
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
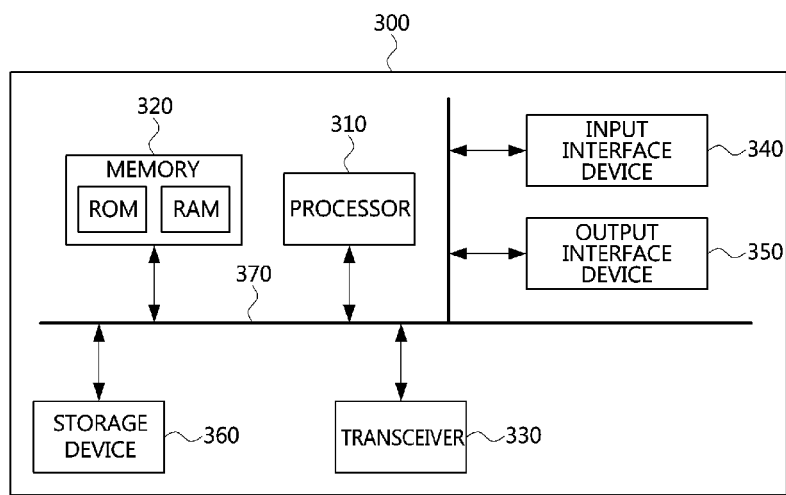
FIG. 3 is a conceptual diagram illustrating embodiments of a communication node constituting a cellular communication system.

FIG. 3 is a conceptual diagram illustrating embodiments of a communication node operating within a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
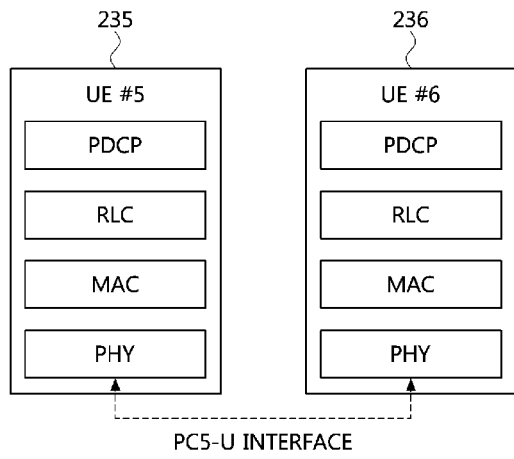
FIG. 4 is a block diagram illustrating embodiments of a user plane protocol stack of an UE performing sidelink communication.

FIG. 4 is a block diagram illustrating embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1 shown above. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
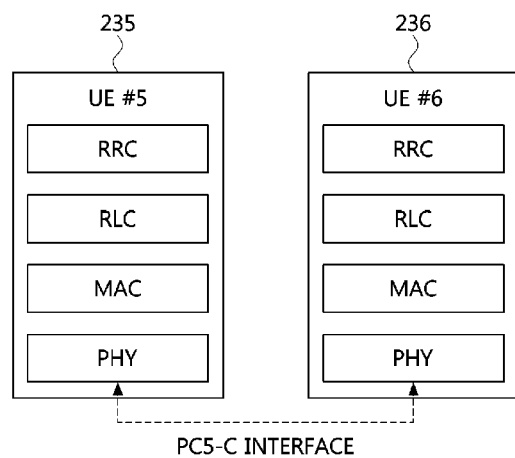
FIG. 5 is a block diagram illustrating a first embodiment of a control plane protocol stack of an UE performing sidelink communication.
Figure 6:
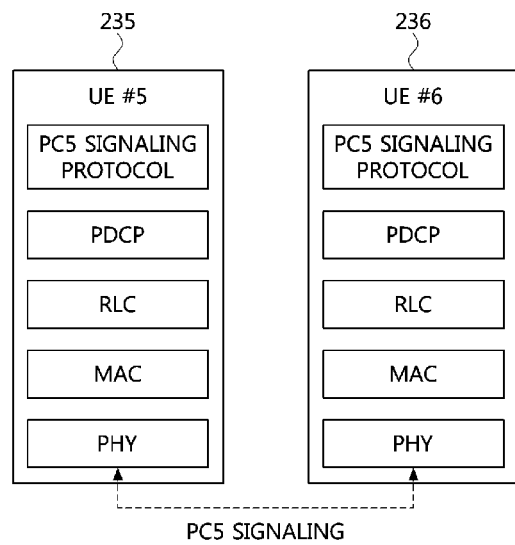
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication. It is to be understood that the first and second embodiments of the control plane protocol stack are not necessarily mutually exclusive, but may include various commonalities, such that each embodiment may utilize functionality associated with the other embodiment as described below.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in |

TABLE 2-continued

| Sidelink TM | Description |
| --- | --- |
| | V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Next, heterogeneous carrier (re)selection methods in the communication system (e.g., cellular communication system) supporting the V2X communication as described above will be described. For the purpose of the present disclosure, the phrase "(re)selection" may refer to a selection, or a re-selection, and is referenced herein as "(re)selection" for the sake simplicity. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a first vehicle is described, a corresponding second vehicle may perform an operation corresponding to the operation of the first vehicle. Conversely, when an operation of the second vehicle is described, the corresponding first vehicle may perform an operation corresponding to the operation of the second vehicle. In the embodiments described below, the operation of the vehicle may be the operation of the communication node located in the vehicle.

Meanwhile, in the communication system supporting V2X communication, the communication node (e.g., communication node supporting the side link TM 4) located in the vehicle may perform a resource pool (re)selection procedure. The resource pool (re)selection procedure may be performed based on a channel busy ratio (CBR) measured at the communication node, and CBR measurement for the resource pool (re)selection procedure may be performed at a preset cycle (hereinafter referred to as a "resource pool CBR cycle"). The CBR may indicate a congestion level, an occupancy state, a load state, etc. of a carrier (e.g., channel).

Also, the communication node located in the vehicle may perform communication based on the CA scheme. For example, the communication node may perform communication using a primary carrier and one or more secondary carriers. The secondary carrier used for the V2X communication may be determined based on the CBR. That is, a carrier (re)selection procedure may be performed based on the CBR measured at the communication node, and CBR measurement for the carrier (re)selection procedure may be performed according to a preset cycle (hereinafter referred to as a "carrier CBR cycle").

The carrier CBR cycle may be configured independently of the resource pool CBR cycle. The carrier CBR cycle and the resource pool CBR cycle may be configured as follows.

Figure 7:
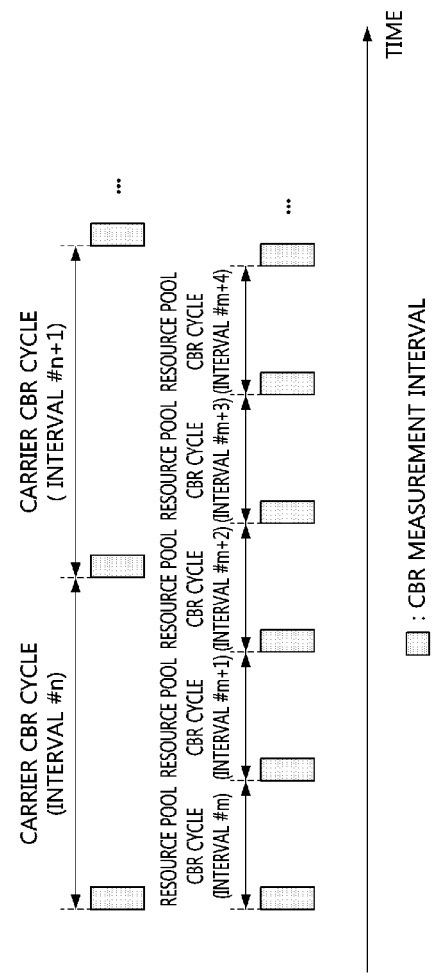
FIG. 7 is a timing diagram illustrating a carrier CBR cycle and a resource pool CBR cycle in a cellular communication system.

FIG. 7 is a timing diagram illustrating a carrier CBR cycle and a resource pool CBR cycle in a cellular communication system.

As shown in FIG. 7, intervals (e.g., interval #n, interval #n+1, etc.) in which the carrier (re)selection procedure is performed are configured by a counter corresponding to the CBR measurement cycle (e.g., carrier CBR cycle) for the carrier (re)selection procedure. The intervals in which the carrier (re)selection procedure is performed may be configured continuously or discontinuously. Here, n may be an integer greater than or equal to 0. The communication node may perform the CBR measurement according to the carrier CBR cycle. When the measured CBR is below a threshold, the communication node may perform V2X communication using the current carrier without reselecting a carrier (e.g., secondary carrier). That is, the measured CBR which is below the threshold may indicate that the current carrier is not in a congested state. On the other hand, when the measured CBR is above the threshold, the communication node may perform the carrier reselection procedure and perform the V2X communication using the reselected carrier. That is, the measured CBR which is above the threshold may indicate that the current carrier is in the congested state. Here, the resource pool for the reselected carrier may be configured by the base station.

Intervals (e.g., interval #m, interval #m+1, interval #m+2, etc.) in which the resource pool (re)selection procedure is performed may be configured by a counter corresponding to the CBR measurement cycle procedure (e.g., resource pool CBR cycle) for the resource pool (re)selection. The intervals in which the resource pool (re)selection procedure is performed may be configured continuously or discontinuously. Here, m may be an integer greater than or equal to 0. The communication node may perform the CBR measurement according to the resource pool CBR cycle. When the measured CBR is below a threshold, the communication node may perform V2X communication using the current resource pool without reselecting a resource pool. That is, the measured CBR which is below the threshold may indicate that the current resource pool is not in the congested state. On the other hand, when the measured CBR is above the threshold, the communication node may perform the resource pool reselection procedure and perform the V2X communication using the reselected resource pool. That is, the measured CBR which is above the threshold may indicate that the current resource pool is in the congested state.

In case that the carrier CBR cycle is set longer than the resource pool CBR cycle, the resource pool (re)selection procedure according to the resource pool CBR cycle may be performed while the V2X communication is performed using the carrier selected by the communication node. In this case, the V2X communication may be delayed by the resource pool (re)selection procedure. In order to solve this problem, the resource pool CBR cycle may be configured as follows.

FIGS. 8-12 include sequence charts illustrating first through fifth embodiments of a V2X communication method based on a CA scheme in a cellular communication system. It is to be understood that the first through fifth embodiments of the V2X communication method are not necessarily mutually exclusive, but may include various commonalities, such that each embodiment may utilize functionality associated with any one or more other embodiments as described below.

Figure 8:
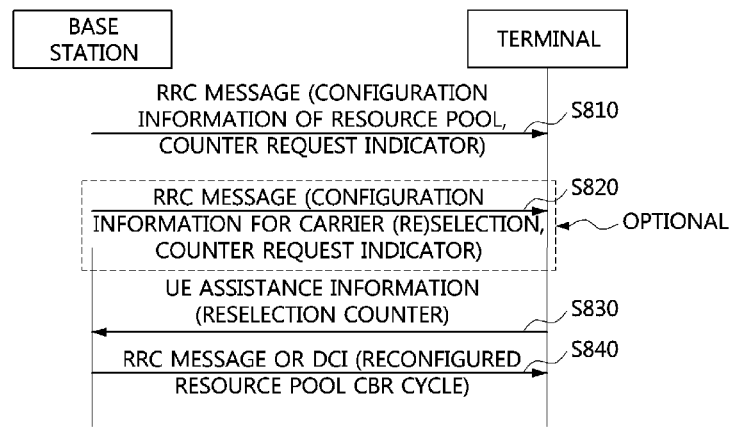
FIG. 8 is a sequence chart illustrating a first embodiment of a V2X communication method based on a CA scheme in a cellular communication system.

First, FIG. 8 is a sequence chart illustrating a first embodiment of a V2X communication method based on a CA scheme in a cellular communication system.

As shown in FIG. 8, a cellular communication system supporting V2X communication may include a base station and a terminal, and the terminal may be located in a vehicle. For example, the base station of FIG. 8 may be a base station belonging to the cellular communication system 140 of FIG. 1, and the terminal of FIG. 8 may be located in the first vehicle 100 of FIG. 1. The base station and the terminal may be configured to be the same as or similar to the communication node 300 shown in FIG. 3 and may support the protocol stack shown in FIGS. 4 to 6.

The base station may generate an RRC message (e.g., RRC connection reconfiguration message) including configuration information of a resource pool, and may transmit the generated RRC message to the terminal (S810). Here, the RRC message may further include an indicator (hereinafter referred to as a "counter request indicator") for requesting reporting of a reselection counter. The interval corresponding to the reselection counter may be an interval in which the carrier (re)selection procedure is performed (e.g., an interval according to the carrier CBR cycle), and the reselection counter may be arbitrarily selected by the terminal. One reselection counter may be selected for a specific service. The terminal may receive the RRC message from the base station, and identify the configuration information of the resource pool and the counter request indicator based on the received RRC message.

Also, when the terminal operates based on the CA scheme, the base station may generate an RRC message including configuration information for carrier (re)selection, and transmit the generated RRC message to the terminal (S820). Here, the counter request indicator may be transmitted via the RRC message of the step S820 instead of the RRC message of the step S810. For example, the counter request indicator may be included in an 'SL-V2X-FreqSelectionConfigList' of the RRC message. In addition, the SL-V2X-FreqSelectionConfigList may further include information indicating deactivation of the CBR measurement procedure for resource pool (re)selection. In this case, the terminal may not perform the CBR measurement procedure for resource pool (re)selection.

The configuration information for carrier (re)selection may include a reselection threshold and a keeping threshold. The keeping threshold may be above than the reselection threshold. When the CBR measured by the terminal is above than the reselection threshold, the terminal may determine one or more candidate secondary carriers. After that, when the CBR measured by the terminal is above than the keeping threshold, the terminal may perform a carrier (re)selection procedure for one candidate secondary carrier among the one or more candidate secondary carriers. The terminal may receive the RRC message from the base station, and may identify the configuration information for carrier (re)selection and the counter request indicator based on the received RRC message. Here, the step S820 may be omitted.

When the reporting of the reselection counter is requested, the terminal may transmit a message (e.g., UE assistance information) including the reselection counter to the base station (S830).

The base station may identify the reselection counter of the terminal based on the message received from the terminal, and compare the cycle (e.g., carrier CBR cycle) according to the reselection counter of the terminal with the resource pool CBR cycle. When the resource pool CBR cycle (e.g., the counter corresponding to the resource pool CBR cycle) is shorter than the carrier CBR cycle (e.g., the reselection counter), the base station may reconfigure the resource pool CBR cycle to be greater than or equal to the carrier CBR cycle. The base station may generate an RRC message (e.g., RRC connection reconfiguration message) including the reconfigured resource pool CBR cycle (e.g., counter corresponding to the reconfigured resource pool CBR cycle), and may transmit the RRC message to the terminal (S840). For example, the reconfigured resource pool CBR cycle may be included in an 'SL-CBR-Common-TxConfigList' of the RRC message. Alternatively, the reconfigured resource pool CBR cycle may be transmitted via downlink control information (DCI).

The terminal may receive the RRC message or the DCI from the base station, identify the reconfigured resource pool CBR cycle based on the received RRC message or the DCI, and perform the resource pool (re)selection procedure according to the reconfigured resource pool CBR cycle. In this case, the resource pool (re)selection procedure (e.g., the CBR measurement procedure for resource pool (re)selection) may not be performed at the terminal until the reselection counter becomes zero.

Figure 9:
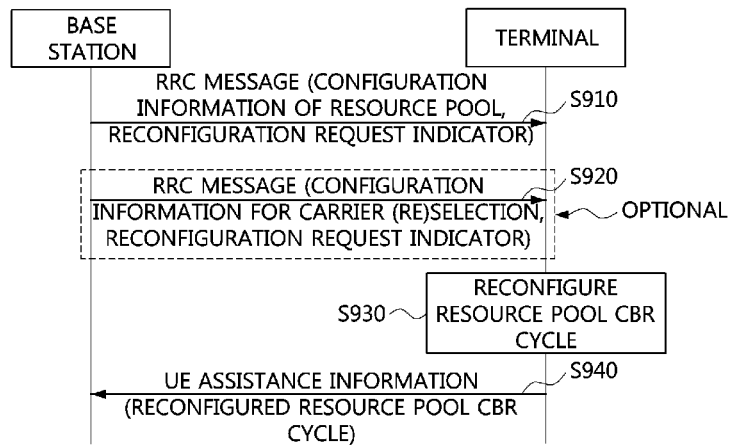
FIG. 9 is a sequence chart illustrating a second embodiment of a V2X communication method based on a CA scheme in a cellular communication system.

FIG. 9 is a sequence chart illustrating a second embodiment of a V2X communication method based on a CA scheme in a cellular communication system.

As shown in FIG. 9, a cellular communication system supporting V2X communication may include a base station and a terminal, and the terminal may be located in a vehicle. For example, the base station of FIG. 9 may be a base station belonging to the cellular communication system 140 of FIG. 1, and the terminal of FIG. 9 may be located in the first vehicle 100 of FIG. 1. The base station and the terminal may be configured to be the same as or similar to the communication node 300 shown in FIG. 3 and may support the protocol stack shown in FIGS. 4 to 6.

The base station may generate an RRC message (e.g., RRC connection reconfiguration message) including configuration information of a resource pool, and may transmit the generated RRC message to the terminal (S910). Here, the RRC message may further include an indicator (hereinafter referred to as a "reconfiguration request indicator") for requesting to reconfigure the resource pool CBR cycle (e.g., counter corresponding to the resource pool CBR cycle). The terminal may receive the RRC message from the base station, and identify the configuration information of the resource pool and the reconfiguration request indicator based on the received RRC message.

Also, when the terminal operates based on the CA scheme, the base station may generate an RRC message including configuration information for carrier (re)selection, and transmit the generated RRC message to the terminal (S920). The reconfiguration request indicator may be transmitted via the RRC message of the step S920 instead of the RRC message of the step S910. For example, the reconfiguration request indicator may be included in the 'SL-V2X-FreqSelectionConfigList' of the RRC message. In addition, the SL-V2X-FreqSelectionConfigList may further include information indicating deactivation of the CBR measurement procedure for resource pool (re)selection. In this case, the terminal may not perform the CBR measurement procedure for resource pool (re)selection. The terminal may receive the RRC message from the base station, and identify the configuration information for the carrier (re)selection and the reconfiguration request indicator based on the received RRC message. Here, the step S920 may be omitted.

If the reconfiguration of the resource pool CBR cycle is requested, the terminal may reconfigure the resource pool CBR cycle in consideration of the reselection counter (S930). For example, the terminal may compare the resource pool CBR cycle with the cycle (e.g., carrier CBR cycle) according to the reselection counter. An initial value of the resource pool CBR cycle may be configured by the base station. When the resource pool CBR cycle is shorter than the carrier CBR cycle, the terminal may reconfigure the resource pool CBR cycle to be greater than or equal to the carrier CBR cycle. The terminal may generate a message (e.g., UE assistance information) including the reconfigured resource pool CBR cycle (e.g., counter corresponding to the reconfigured resource pool CBR cycle) and may transmit the message to the base station (S940).

The base station may receive the message from the terminal, and identify the resource pool CBR cycle reconfigured by the terminal based on the received message. In this case, the base station may determine that the CBR measurement for resource pool (re)selection is performed according to the reconfigured resource pool CBR cycle, and may not expect to receive a CBR measured for the resource pool (re)selection procedure from the terminal before the CBR is measured according to the reconfigured resource pool CBR cycle.

The terminal may perform the resource pool (re)selection procedure according to the resource pool CBR cycle reconfigured in the step S930. In this case, the resource pool (re)selection procedure (e.g., the CBR measurement procedure for resource pool (re)selection) may not be performed at the terminal until the reselection counter becomes zero.

Meanwhile, the terminal may configure a plurality of reselection counters for a specific service (e.g., MAC protocol data units (PDU) for providing the specific service). The plurality of reselection counters may have the same value or different values. In this case, the resource pool CBR cycle may be configured as follows.

Figure 10:
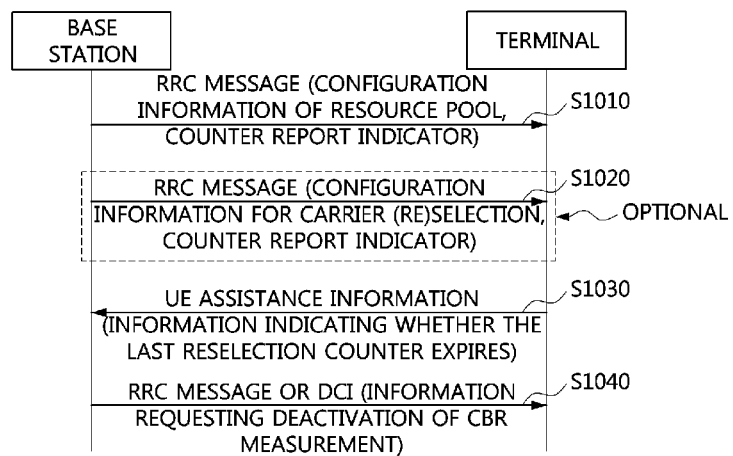
FIG. 10 is a sequence chart illustrating a third embodiment of a V2X communication method based on a CA scheme in a cellular communication system.

FIG. 10 is a sequence chart illustrating a third embodiment of a V2X communication method based on a CA scheme in a cellular communication system.

As shown in FIG. 10, a cellular communication system supporting V2X communication may include a base station and a terminal, and the terminal may be located in a vehicle. For example, the base station of FIG. 10 may be a base station belonging to the cellular communication system 140 of FIG. 1, and the terminal of FIG. 10 may be located in the first vehicle 100 of FIG. 1. The base station and the terminal may be configured to be the same as or similar to the communication node 300 shown in FIG. 3 and may support the protocol stack shown in FIGS. 4 to 6.

The base station may generate an RRC message (e.g., RRC connection reconfiguration message) including configuration information of a resource pool, and may transmit the generated RRC message to the terminal (S1010). Here, the RRC message may further include an indicator (hereinafter referred to as a "counter report indicator") for requesting to inform whether a plurality of reselection counters are configured or not. The counter report indicator may be an indicator requesting to inform whether a next reselection counter is present. The terminal may receive the RRC message from the base station, and identify the configuration information of the resource pool and the counter report indicator based on the received RRC message.

Also, when the terminal operates based on the CA scheme, the base station may generate an RRC message including configuration information for carrier (re)selection, and transmit the generated RRC message to the terminal (S1020). The counter report indicator may be transmitted via the RRC message of the step S1020 instead of the RRC message of the step S1010. For example, the counter report indicator may be included in the 'SL-V2X-FreqSelectionConfigList' of the RRC message. The terminal may receive the RRC message from the base station, and identify the configuration for carrier (re)selection and the counter report indicator based on the received RRC message. Here, the step S1020 may be omitted.

When the request is made to inform whether a plurality of reselection counters are configured (e.g., when it is requested to inform whether the next reselection counter is present), the terminal may determine whether the next reselection counter (e.g., interval #n+1 corresponding to the next reselection counter) exists after expiration of the current reselect counter (e.g., interval #n corresponding to the current reselection counter). If the next reselection counter exists, the terminal may transmit a message (e.g., UE assistance information) indicating that a plurality of reselection counters are configured (e.g., information indicating that the next reselection counter exists), and may transmit the generated message to the base station (S1030). The step S1030 may be performed each time the reselection counter (e.g., the interval corresponding to the reselection counter) expires.

The base station may receive the message from the terminal, and may confirm that a plurality of reselection counters are configured (e.g., the presence of the next reselection counter) based on the received message. In this case, the base station may generate an RRC message (e.g., RRC connection reconfiguration message) or DCI including information requesting deactivation of the CBR measurement procedure for resource pool (re)selection, and transmit the generated RRC message or DCI to the terminal (S1040). That is, the base station may request deactivation of the CBR measurement procedure for resource pool (re)selection during the intervals corresponding to all the reselection counters configured by the terminal. In this case, the base station may not expect to receive a CBR measured for the resource pool (re)selection procedure from the terminal before all the reselection counters (e.g., intervals corresponding to all the reselection counters) expire.

The terminal may receive the RRC message or the DCI from the base station, and may determine that the CBR measurement procedure for resource pool (re)selection is not performed during the intervals corresponding to all the reselection counters configured by the terminal based on the received RRC message or DCI. In this case, the resource pool (re)selection procedure (e.g., CBR measurement procedure for resource pool (re)selection) may not be performed at the terminal until all the reselection counters expire.

Figure 11:
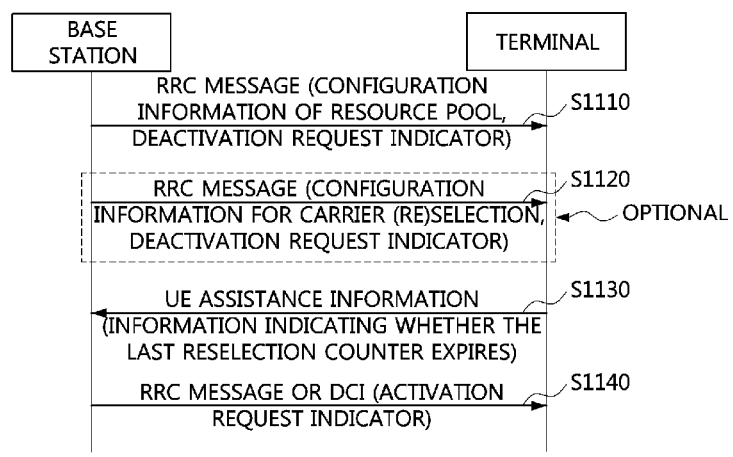
FIG. 11 is a sequence chart illustrating a fourth embodiment of a V2X communication method based on a CA scheme in a cellular communication system.

FIG. 11 is a sequence chart illustrating a fourth embodiment of a V2X communication method based on a CA scheme in a cellular communication system.

As shown in FIG. 11, a cellular communication system supporting V2X communication may include a base station and a terminal, and the terminal may be located in a vehicle. For example, the base station of FIG. 11 may be a base station belonging to the cellular communication system 140 of FIG. 1, and the terminal of FIG. 11 may be located in the first vehicle 100 of FIG. 1. The base station and the terminal may be configured to be the same as or similar to the communication node 300 shown in FIG. 3 and may support the protocol stack shown in FIGS. 4 to 6. Here, the terminal may configure a plurality of reselection counters for a specific service (e.g., MAC PDUs for providing the specific service).

The base station may generate an RRC message (e.g., RRC connection reconfiguration message) including configuration information of a resource pool, and may transmit the generated RRC message to the terminal (S1110). Here, the RRC message may include an indicator (hereinafter referred to as a "deactivation request indicator") requesting deactivation of the CBR measurement procedure for resource pool (re)selection during the intervals corresponding to all the reselection counters configured by the terminal. The terminal may receive the RRC message from the base station, and identify the configuration information of the resource pool and the deactivation request indicator based on the received RRC message. In this case, the terminal may not perform the resource pool (re)selection procedure (e.g., CBR measurement procedure for resource pool (re)selection) until all the reselection counters (e.g., intervals corresponding to all the reselection counters) expire.

Also, when the terminal operates based on the CA scheme, the base station may generate an RRC message including configuration information for carrier (re)selection, and transmit the generated RRC message to the terminal (S1120). The deactivation request indicator may be transmitted via the RRC message of the step S1120 instead of the RRC message of the step S1110. For example, the deactivation request may be included in the 'SL-V2X-FreqSelectionConfigList' of the RRC message. The terminal may receive the RRC message from the base station, and identify the configuration for carrier (re)selection and the deactivation request indicator based on the received RRC message. Here, the step S1120 may be omitted.

After the current reselection counter (e.g., the interval corresponding to the current reselection timer) expires, the terminal may transmit a message (e.g., UE assistance information) indicating whether the current reselection counter is the last counter (e.g., the last interval) (S1130). That is, the step S1130 may be performed each time the reselection counter (e.g., the interval corresponding to the reselection counter) expires.

The base station may receive the message from the terminal, and may determine whether the last reselection counter expires at the terminal based on the received message. The base station may not expect to receive a CBR measured for the resource pool (re)selection procedure from the terminal until the last reselection counter expires.

When the information indicating the expiry of the last reselection counter is received from the terminal, the base station may transmit an indicator (hereinafter referred to as an 'activation request indicator') for requesting activation of the CBR measurement procedure for resource pool (re) selection (S1140). The activation request indicator may be transmitted from the base station to the terminal via an RRC message or a DCI.

Figure 12:
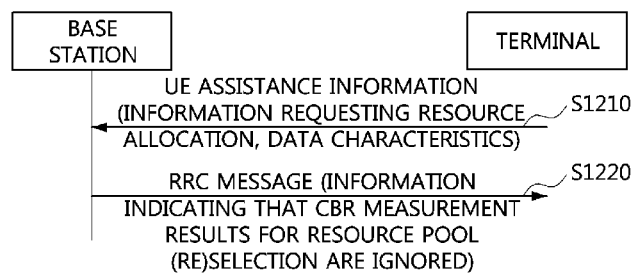
FIG. 12 is a sequence chart illustrating a fifth embodiment of a V2X communication method based on a CA scheme in a cellular communication system.

FIG. 12 is a sequence chart illustrating a fifth embodiment of a V2X communication method based on a CA scheme in a cellular communication system.

As shown in FIG. 12, a cellular communication system supporting V2X communication may include a base station and a terminal, and the terminal may be located in a vehicle. For example, the base station of FIG. 12 may be a base station belonging to the cellular communication system 140 of FIG. 1, and the terminal of FIG. 12 may be located in the first vehicle 100 of FIG. 1. The base station and the terminal may be configured to be the same as or similar to the communication node 300 shown in FIG. 3 and may support the protocol stack shown in FIGS. 4 to 6.

The terminal may generate a message (e.g., UE assistance information) including information indicating that the terminal is interested in performing V2X communication or information requesting allocation of a transmission resource (e.g., resource pool) for V2X communication, and transmit the generated message to the base station (S1210). Also, the message may further include information indicating characteristics of data (e.g., low latency data, emergency data, or the like) to be transmitted by the terminal through a sidelink for V2X communication.

The base station may receive the message from the terminal, and identify the information included in the received message. For example, the base station may determine the characteristics of the data based on the received message, and determine a transmission procedure in which CBR measurement results for resource pool (re)selection are ignored based on the characteristics of the data. For example, it may be determined that the CBR measurement results for resource pool (re)selection are ignored in the transmission procedure of the emergency data. The base station may generate an RRC message (e.g., RRC connection reconfiguration message) including the configuration information of the resource pool and information indicating that the CBR measurement results for resource pool (re) selection are ignored, and transmit the generated RRC message to the terminal (S1220).

The terminal may receive the RRC message from the base station, and may operate based on the information included in the received RRC message. For example, the RRC layer of the terminal may instruct the MAC layer of the terminal to inform the RRC layer that one of the following conditions 1 and 2 is satisfied when the one of the following Conditions is satisfied.

Condition 1: When the reselection counter is not 0
Condition 2: When the reselection counter is 0 and transmission data exist The MAC layer of the terminal may determine whether one of the conditions 1 and 2 is satisfied according to the request of the RRC layer. For example, the MAC layer of the terminal may transmit to the RRC layer information indicating that the condition 1 is satisfied when the current reselection counter is not zero. The RRC layer of the terminal may receive from the MAC layer information indicating that the condition 1 for the current reselection counter is satisfied, and may ignore the CBR measurement results for resource pool (re)selection until the RRC layer receives information indicating that the condition 1 for the next reselection counter is satisfied even when the CBR measurement results satisfy resource pool (re)selection conditions.

Alternatively, when there is data to be transmitted through a sidelink traffic channel (STCH) and the current reselection counter is 0, the MAC layer of the terminal may transmit to the RRC layer information indicating that the condition 2 is satisfied. The RRC layer of the terminal may receive from the MAC layer information indicating that the condition 2 for the current reselection counter is satisfied, and may ignore the CBR measurement results for resource pool (re)selection until the next reselection counter for the data is selected even when the CBR measurement results satisfy resource pool (re)selection conditions.

While the embodiments of the present disclosure and their advantages have been described in detail, it should be understood that various changes, substitutions and alterations may be made herein without departing from the scope of the present disclosure

What is claimed is:

1. An operation method of a terminal located in a vehicle supporting vehicle-to-everything (V2X) communication, the operation method comprising:
receiving, from a base station, a first message requesting reporting of information indicating a presence of an interval #n+1 according to a channel busy ratio (CBR) measurement cycle for a carrier (re)selection procedure;
transmitting, by the terminal, a second message to the base station when the interval #n+1 exists after a current interval #n, the second message including information indicating that the interval #n+1 is present; and
receiving, from the base station, a third message including information indicating that a CBR measurement for a resource pool (re)selection procedure is deactivated until an end of the interval #n+1,
wherein the carrier (re)selection procedure is performed in each of the interval #n and the interval #n+1, and n is an integer greater than or equal to 0.

2. The operation method according to claim 1, wherein the information indicating that the interval #n+1 is present indicates that a counter for the interval #n+1 is configured.

3. The operation method according to claim 1, wherein the transmitting of the second message is performed when each interval according to the CBR measurement cycle for the carrier (re)selection procedure ends.

4. The operation method according to claim 1, wherein the first message is a radio resource control (RRC) message including configuration information of a resource pool.

5. An operation method of a terminal located in a vehicle supporting vehicle-to-everything (V2X) communication, the operation method comprising:
receiving, from a base station, a first message including information indicating a deactivation of a channel busy ratio (CBR) measurement for a resource pool (re) selection procedure;
performing, by the terminal, a carrier (re)selection procedure without the CBR measurement for the resource pool (re)selection procedure in an interval #n according to a CBR measurement cycle for the carrier (re)selection procedure; and
when the carrier (re)selection procedure is completed in the interval #n, transmitting, by the terminal, a second message to the base station, the second message including information indicating whether the carrier (re)

selection procedure performed in the interval #n is a last carrier (re)selection procedure.

6. The operation method according to claim 5, wherein the CBR measurement for the resource pool (re)selection procedure is not performed by the terminal until the last carrier (re)selection procedure is completed.

7. The operation method according to claim 5, further comprising, after transmitting the second message, and when the second message includes information indicating that the carrier (re)selection procedure performed in the interval #n is the last carrier (re)selection procedure, receiving, from the base station, information indicating an activation of the CBR measurement for the resource pool (re)selection procedure.

8. The operation method according to claim 5, wherein the first message is a radio resource control (RRC) message including configuration information of a resource pool.

* * * * *